United States Patent
Hu et al.

(10) Patent No.: US 10,931,539 B2
(45) Date of Patent: Feb. 23, 2021

(54) GRAPHICAL USER INTERFACE FOR DISPLAYING A NETWORK TRAFFIC ROUTE IN A SINGLE-VIEW DISPLAY

(71) Applicant: Cisco Technology, Inc., San Jose, CA (US)

(72) Inventors: Yongmei Hu, Los Altos, CA (US); Ryder S. Booth, Mountain View, CA (US); Shyam Srinivasan, Fremont, CA (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 40 days.

(21) Appl. No.: 16/231,334

(22) Filed: Dec. 21, 2018

(65) Prior Publication Data
US 2020/0204457 A1   Jun. 25, 2020

(51) Int. Cl.
*H04L 12/24* (2006.01)
*H04L 12/761* (2013.01)
*H04L 12/751* (2013.01)

(52) U.S. Cl.
CPC .............. *H04L 41/22* (2013.01); *H04L 41/12* (2013.01); *H04L 45/02* (2013.01); *H04L 45/16* (2013.01)

(58) Field of Classification Search
CPC ......... H04L 41/22; H04L 45/02; H04L 41/12; H04L 45/16
See application file for complete search history.

(56) References Cited

U.S. PATENT DOCUMENTS

| 7,315,985 | B1* | 1/2008 | Gauvin | H04L 41/12 715/734 |
|---|---|---|---|---|
| 7,519,700 | B1 | 4/2009 | Sapsford et al. | |
| 7,836,402 | B2 | 11/2010 | Martineau et al. | |
| 7,974,219 | B2 | 7/2011 | Strahan et al. | |
| 8,838,282 | B1* | 9/2014 | Ratliff | H02J 13/0013 700/19 |
| 9,106,555 | B2 | 8/2015 | Agarwal et al. | |
| 9,258,195 | B1 | 2/2016 | Pendleton et al. | |
| 2007/0208840 | A1 | 9/2007 | McConville et al. | |

(Continued)

OTHER PUBLICATIONS

McMullen, Kevin, "Using active networking to detect and troubleshoot issues in tactical data networks", Calhoun: The NPS Institutional Archive DSpace Repository, dated Jun. 2014, 92 pages.

*Primary Examiner* — Jeffrey M Rutkowski
*Assistant Examiner* — Chae S Lee
(74) *Attorney, Agent, or Firm* — Merchant & Gould P.C.

(57) ABSTRACT

A first node associated with a first site indicator is selected in a computer-generated graphical user interface. An expanded view of a first tab depicting a first set of nodes is presented. The first node represents a first internetworking device at the first physical site. A second node associated with a second site indicator is selected. An expanded view of a second tab depicting a second set of nodes is presented. The second node represents a second internetworking device at the second physical site external to the first physical site. A path route between the first node and the second node, intersecting nodes connecting the first node and the second node, additional nodes immediately adjacent to the intersecting nodes are determined. The path route, intersecting nodes, and additional nodes are displayed in the first tab and the second tab.

20 Claims, 4 Drawing Sheets

(56) References Cited

U.S. PATENT DOCUMENTS

| | | | |
|---|---|---|---|
| 2013/0042020 A1 | 2/2013 | Stiffler et al. | |
| 2013/0111374 A1* | 5/2013 | Hamilton | H04L 41/22 |
| | | | 715/763 |
| 2015/0103672 A1* | 4/2015 | Stuart | H04L 45/38 |
| | | | 370/241 |
| 2017/0093645 A1* | 3/2017 | Zhong | G06F 3/0482 |
| 2017/0358111 A1 | 12/2017 | Madsen | |

* cited by examiner

GRAPHICAL USER INTERFACE FOR DISPLAYING A NETWORK TRAFFIC ROUTE IN A SINGLE-VIEW DISPLAY

FIELD OF THE DISCLOSURE

One technical field of the present disclosure is computer-implemented generating and displaying visual displays of network topology of computing and network resources in a computer-generated graphical user interface. Another technical field is display mechanisms for monitoring and troubleshooting internetworking infrastructure elements in network management systems.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

A network topology is a view of the structure of network resources that shows logical and/or physical arrangements and connections between network elements. The network topology may be depicted in a network topology map as nodes that represent network infrastructure elements or endpoints, and edges or links which represent network connection information. However, as the network grows, the number of nodes and the number of links increase, creating challenges for presenting the network connection information in a single-view display of the computer-generated graphical user interface.

To accommodate space for new network elements, existing topology approaches typically depict nodes in smaller sizes and/or show links more densely in the network topology map, making it difficult to read or digest the connections and routes between the nodes. Further, existing topology display techniques may produce topology maps that leave less space for the description of the nodes and links which can cause loss of information on the traffic routes connecting one or more nodes in different sites, ultimately resulting in a failure in monitoring and troubleshooting the network elements.

BRIEF DESCRIPTION OF THE DRAWINGS

The example embodiment(s) of the present invention is illustrated by way of example, and not in a way by limitation, in the figures of the accompanying drawings and in which like reference numerals refer to similar elements and in which.

DETAILED DESCRIPTION

In the following description, for the purposes of explanation, numerous specific details are set forth in order to provide a thorough understanding of the present disclosure. It will be apparent, however, that the present disclosure may be practiced without these specific details. In other instances, well-known structures and devices are shown in block diagram form in order to avoid unnecessarily obscuring the present disclosure. Embodiments are described in sections below according to the following outline:

General Overview

Techniques for displaying a network topology of computing and network resources in a graphical user interface are described. In one embodiment, a first node associated with a first site indicator is selected in a computer-generated graphical user interface. An expanded view of a first tab depicting a first set of nodes is presented. The first node represents a first internetworking device at a first physical site. A second node associated with a second site indicator is selected. An expanded view of a second tab depicting a second set of nodes is presented. The second node represents a second internetworking device at a second physical site external to the first physical site. A path route between the first node and the second node is determined. Intersecting nodes connecting the first node and the second node, and additional nodes that are immediately adjacent to the intersecting nodes are determined. The path route comprising the first node, second node, and intersecting nodes, and the additional nodes are concurrently displayed over the expanded view of the first tab and the expanded view of the second tab.

1. Architecture of a Hierarchical Network Topology
1.1 Tabs Representing Physical Sites FIG. 1 illustrates an example computer-generated graphical interface for presenting a network traffic route between two devices in different sites.

Figure 1:
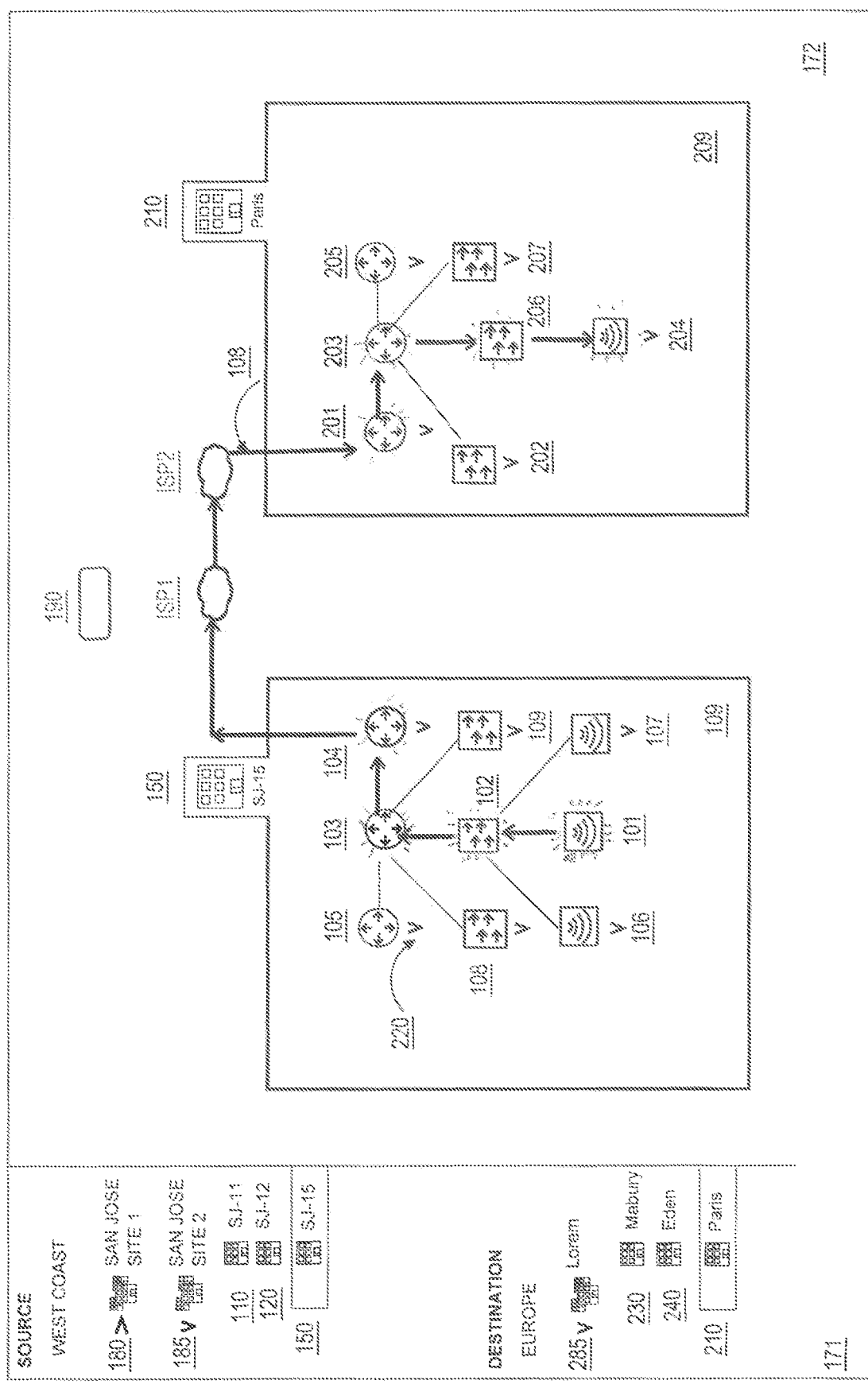
FIG. 1 illustrates an example computer-generated graphical interface for presenting a network traffic route between two devices on different sites in a network topology map.

The example structure of FIG. 1 comprises a plurality of nodes representing physical sites 180, 185, 285, a plurality of nodes representing building sites 110, 120, 150, 210, 230, 240 and one or more nodes representing internetworking devices 101, 102, 103, 104, 105, 106, 107, 108, 109, 201, 202, 203, 204, 205, 206, 207. The network topology structure is stored in electronic digital computer memory and organized as one or more nodes representing internetworking infrastructure elements that are communicatively coupled within the computer network or the cloud. The physical sites may include local area networks, wide area networks, internetworks or internets. One or more building units can reside within the physical site and the building units may include one or more internetworking devices which may be associated with the building unit and the physical site. The internetworking device can include any of a router, a switch, or a gateway for a local network associated with the physical site and the building unit.

In some embodiments, a location panel 171 may be displayed on one side of the computer-generated graphical interface to list different physical sites that have building units. Each physical site may include one or more building units. As illustrated in FIG. 1, the location panel 171 may include a source location and a destination location. The source location may include a source node and the destination location may include a destination node. Each source location and destination location may include one or more physical sites and one or more building units. For example, the source location (West Coast region) may include a San Jose site 1 and San Jose site 2. Each physical site can be represented as a site indicator. For example, the San Jose physical site 1 may be represented as a site indicator 180 and the San Jose physical site 2 may be represented as a site indicator 185. Each physical site may have one or more building units that are located within the physical site. For instance, within the San Jose site 2, the SJ-11 building is represented as a building icon 110, the SJ-12 building is represented as a building icon 120, and the SJ-15 building is represented as a building icon 150. Each building unit can be represented as a building icon and may be visually represented differently from the site indicators.

Similarly, the destination location (Europe) may include a Lorem site that is represented by a site indicator 285. The Lorem site may include a Mabury building unit which is represented by building icon 230, an Eden building unit which is represented by building icon 240, and a Paris building unit which is represented by building icon 210.

Upon detecting a selection of the site indicator 185, one or more building units within the San Jose site 2 may be displayed as associated building units 110, 120, 150 that the user can select from. In an embodiment, input selecting SJ-15 causes a first panel 109 to be displayed in the computer-generated graphical user interface. The first panel 109 may be displayed in a map panel 172 adjacent to the location panel 171. Each tab represents a corresponding physical site or building unit and may include a topology map for the corresponding physical site or the corresponding building unit. For example, upon detecting the selection of the building unit SJ-15, the first tab 109 is caused to be presented in the computer-generated user interface to show the network topology map for the SJ-15.

In the expanded view of the first tab 109, one or more internetworking devices 101, 102, 103, 104, 105, 106, 107, 108, 109 associated with the SJ-15 can be displayed within the graphical boundary of the expanded view of the first tab 109. The graphical boundary of the first tab 109 may be displayed clearly in the computer-generated graphical user interface that it is presented in a distinguishable manner from other tabs that may be displayed in the map panel 172. In one embodiment, a user may designate a single internetworking device as a source node 101 in the expanded view of the first tab 109.

In another embodiment, input selecting a destination node 204 causes a second tab 209 to be displayed in the map panel 172. The second tab 209 is presented as an expanded tab and may include associated internetworking devices 201, 202, 203, 204, 205, 206, 207 that reside in the Paris building in which the destination node 204 is located. The internetworking devices 201, 202, 203, 204, 205, 206, 207 are depicted as nodes within the graphical boundary of the expanded view of second tab 209.

In some embodiments, a third tab may be presented in an expanded view and may be presented in between the first tab 109 and the second tab 209. The third tab may include a corresponding network topology map that has one or more nodes that may intersect the internetworking devices reside in SJ-15 or Paris building unit. In some embodiments, the third tab may correspond to another building unit in the same physical site as the first tab or the second tab. For example, the third tab may be associated with SJ-12 building in San Jose site 2 or another building in the Europe physical site and may include one or more nodes that are connected to the nodes in the first tab and the second tab as part of the path route. In some embodiments, the third tab may be associated with another physical site or another building in a physical site different from the San Jose site 2 or Europe physical site. The third tab may include a set of nodes that may be different than the set of nodes in the first tab or the second tab. In one instance, the path route may start from the source node 101, followed by nodes in the first tabs 102, 103, 104 and intersecting nodes in the third tab, and nodes in the second tab 201, 203, 206, and the destination node 204. Upon determining the third tab and the associated nodes, a presentation of the expanded view of the third tab with the nodes and the expanded views of the first tab and the second tab may be displayed in the graphical user interface. The intersecting nodes in the third tab may be highlighted concurrently with all the connecting nodes in the first tab and the second tab. The expanded view of the third tab may be displayed external to the graphical boundary of the expanded view of the first tab 109 or the second tab 209.

In some embodiments, nodes associated with additional tabs (e.g., a fourth tab or a fifth tab) may be determined to be connected to nodes in the first tab or the second tab. In one instance, more than one tab associated with one or more building units or physical sites may be determined to be connected to the nodes in the first tab or the second tab and displayed between the expanded view of the first tab and the second tab. The similar mechanism may be applied to the fourth tab or the fifth tab similar to the third tab.

1.2 Path Route Connecting Nodes

In some embodiments, a path route can be displayed to show a network connection between the nodes. The path route indicates a communication path that connects two or more nodes that can support data transmission. In some embodiments, the path route can connect a node representing an internetworking device that resides in a building unit to another node representing another internetworking device resides in another building unit to indicate a connection path between the devices. In some embodiments, the internetworking devices may reside in the same building. The path route is displayed as a path between the nodes.

In one embodiment, a path route can be displayed to show an optimal network data path between the nodes. The path route indicates a traceable data path that is fast, efficient, and optimal that is determined to be the best traffic route from a source node to a destination node. The path route can be selected from all the available links that are displayed in the computer-generated graphical user interface. The path route is determined by the computing device based on the routing information, transmission information, node information or the link information. The path route can be displayed as a line with an arrow to show the traffic direction.

In an embodiment, a plurality of links connecting a plurality of internetworking devices may be displayed in the graphical user interface. The plurality of links shows a data communication path that is available between the devices. For example, the internetworking device 103 may include at least three connections; the first connection to the device 108, the second connection to the device 102, and the third connection to the device 109. Among the three connections, it is determined that the second connection to the device 102 is the best route for data transmission from the source node 101, and thus, the second connection is determined to be part of the path trace 108 and highlighted using visually different attributes compared to other connections.

In some embodiments, the path route may be visually depicted differently from the links (e.g., bold and with arrows). This enables the network administrator to trace the path route and identify intersecting nodes connecting the source node and the destination node. In some embodiments, the path route can be highlighted concurrently with the first node (e.g., source node), the second node (e.g., destination node), and all the intersecting nodes that are displayed in the expanded view of the tabs. For example, as shown in FIG. 1, all the intersecting nodes 102, 103, 104, 201, 203, 206 that connect the source node 101 and the destination node 204 may be highlighted. This enables the network administrator to view the path trace in the single-view display.

In some embodiments, the nodes 105, 106, 107, 108, 109, 202, 205, 207 that are immediately adjacent to the intersecting nodes 102, 103, 104, 201, 203, 206 are determined. These nodes are displayed concurrently with the path route that comprises the first node, the second node, and the intersecting nodes. The nodes 105, 108, 109, 106, 107, 202, 205, 207 that are not part of the path route 108 may appear faded in the graphical user interface. For example, the nodes that are not directly related to the path route 108 may be visually displayed in a less noticeable way for the network administrator to easily detect the path route 108 without getting interrupted by the visually distracting networking elements.

In one embodiment, the node 105 may include a selection widget 220 that is responsive to input via an input device. The selection widget 220 may be implemented as a toggle such that a selection of the widget 220 causes a display of one or more internetworking nodes that are connected to the node 105 that are not part of the path route. One or more nodes that are connected to node 105 (not shown) are non-immediately adjacent nodes to the intersecting nodes 102, 103, 104, 201, 203, 206. These one or more nodes can be second-degree or third-degree connections; however, these nodes are not first-degree connection (i.e., directly connected to the intersecting node). For example, upon selecting the node 105, one or more nodes that are connected to the node 105 may be presented in the expanded view of the first tab 109. In another embodiment, upon deselecting the widget 220, the connecting nodes may collapse and disappear from the expanded view of the first tab 109. This enables the user to view additional connecting nodes and understand the hierarchy of the internetworking devices for troubleshooting. In some embodiments, a selection widget may be associated with an intersecting node 104 to show one or more nodes connected to the intersecting node (not shown).

In some embodiments, a state indicator may be displayed with a node in the computer-generated graphical user interface. The state indicator measures a network communication status of the node to identify the quality of the connection of the node. The state indicator can be represented as three or more categories such as "poor," "fair," and "good." For example, the node with the "poor" state indicator may represent that the node's bandwidth is full which can make the node not optimal to receive or transmit the data. The node with the "good" state indicator may represent that the node's bandwidth is empty which can make the node optimal to receive or transmit the data. The node with the "fair" state indicator falls in-between "poor" and "good." Each category of state indicator may be represented in a different color that the user can easily identify the connection status of the node in the graphical user interface. Different category or color coding may be available depending on the interface configuration.

Internet service provider (ISP) 190 broadly represents any combination of one or more data communication networks including local area networks, wide area networks, internetworks or internets, using any of wireline or wireless links, including terrestrial or satellite links. The network(s) may be implemented by any medium or mechanism that provides for the exchange of data between the various network elements of FIG. 1. The various elements of FIG. 1 may also have direct (wired or wireless) communications links. The nodes and other elements of the system may each comprise an interface compatible with the ISP 190 and are programmed or configured to use standardized protocols for communication across the networks such as TCP/IP, and higher-layer protocols such as HTTP, TLS, and the like.

2. Graphical Interface for Displaying Device Information

Figure 2:
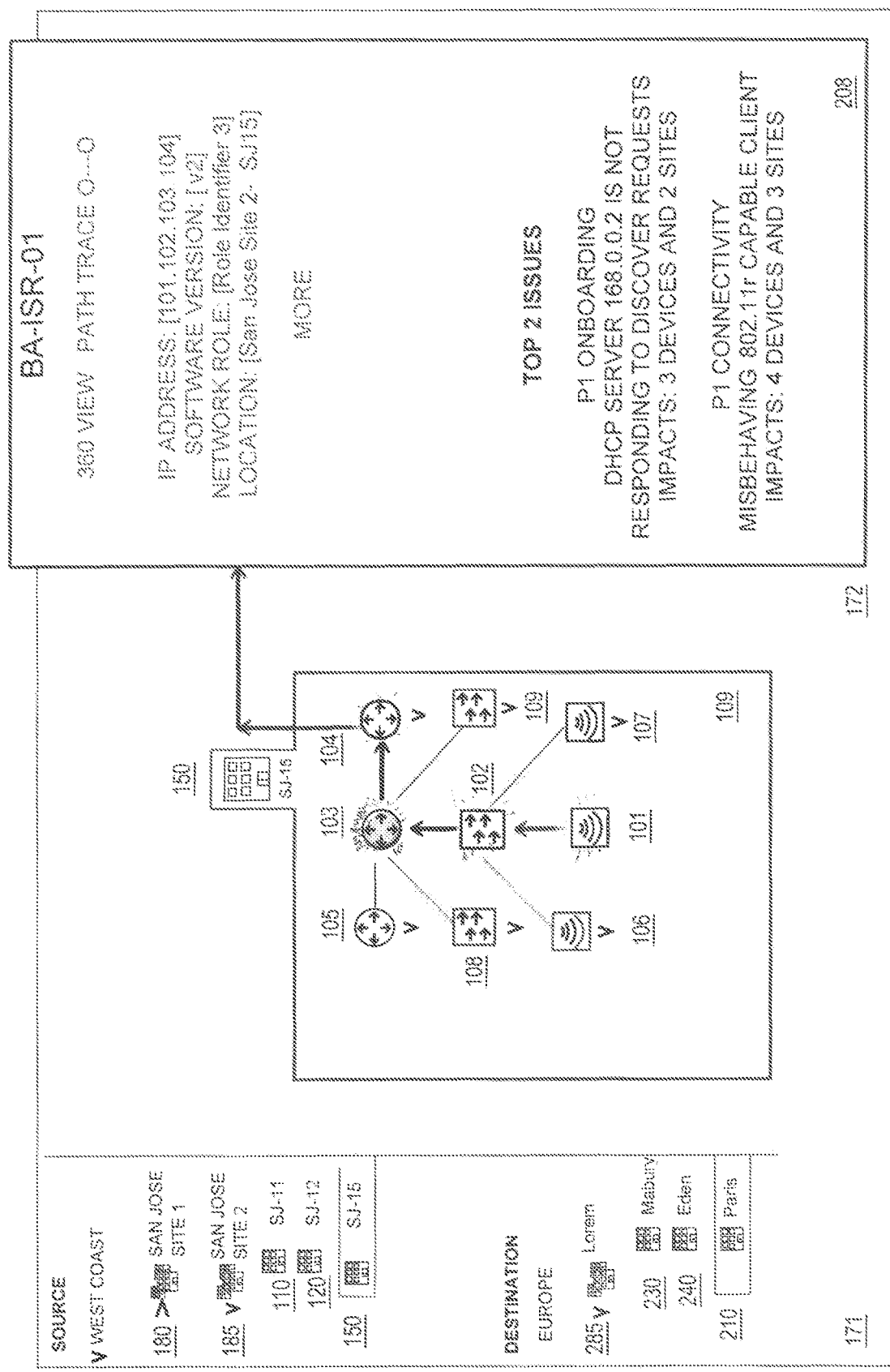
FIG. 2 illustrates an example computer-generated graphical interface for presenting internetworking device information.

FIG. 2 illustrates an example graphical interface presenting internetworking device information.

In some embodiments, upon detecting a selection of an internetworking device in the expanded view of the tab, the transmission information may be caused to be displayed in another window that overlays over the expanded view of the tab. For example, the user can hover over a particular internetworking device or select the particular internetworking device in the graphical user interface (e.g., by clicking the internetworking device) to view the transmission information 208 of the internetworking device 103. It allows the user to determine the status of the internetworking device and identify issues that cause jitter, latency or delay in network transmission. In some embodiments, the data transmission path may be selected based on the transmission information that includes the bandwidth of various elements that connects the internetworking devices.

The transmission information can include the name of the device (e.g., BA-IRS-01) and information about the internetworking device such as the IP address, software version of the device (e.g., version 2), network role (e.g., role identifier 2), physical location (e.g., San Jose 2-SJ 15). In some embodiments, the transmission information includes networking issues that need diagnosing and troubleshooting. The networking issues may be prioritized to show the relative importance of the networking issues that need to be solved.

For example, as shown in FIG. 2, the transmission information window displays the networking issues. Each of the issues is prioritized as P1 which requires immediate attention. The issue description part of the transmission information has the type of networking issues (e.g., onboarding issue, connectivity issue) and details of the issues (e.g., DHCP server not responding). The issue description also shows the number of internetworking devices (e.g., 3 devices) and the number of sites (e.g., 2 physical sites) that are impacted by each networking issue. This enables the network administrator to quickly identify the networking issues that require immediate attention.

In some embodiments, the 360-view of the physical internetworking device is available on the transmission information window. The ports and associated parts of the internetworking device are graphically displayed in the transmission information window upon selecting a 360-view option displayed in the transmission information window.

In another embodiment, a path trace option is available in the transmission information window. Upon selecting the path trace option, any communication path that originates from the selected internetworking device is highlighted in the graphical user interface. The path trace option includes another interface that receives input for the destination node. Upon receiving the input for the destination node, a traceable path route may be displayed on the graphical interface to show a path from the internetworking device to the selected destination node. The transmission information facilitates troubleshooting and monitoring internetworking devices at a remote location. The transmission information listed herein is not the exclusive list and may include other types of information.

Each node may include respective storage which may comprise electronic digital memory, non-volatile storage such as FLASH RAM, disk storage or other suitable digital storage. While nodes are shown to illustrate a clear example, other embodiments may use any number of nodes each having the elements shown in FIG. 2 for nodes. For purposes of illustrating a clear example, the node and its components have been described with certain functions, but the same operations can be performed using node and others that may be used in a distributed computer system in a practical embodiment.

3. Example Processes and Algorithms

Figure 3:
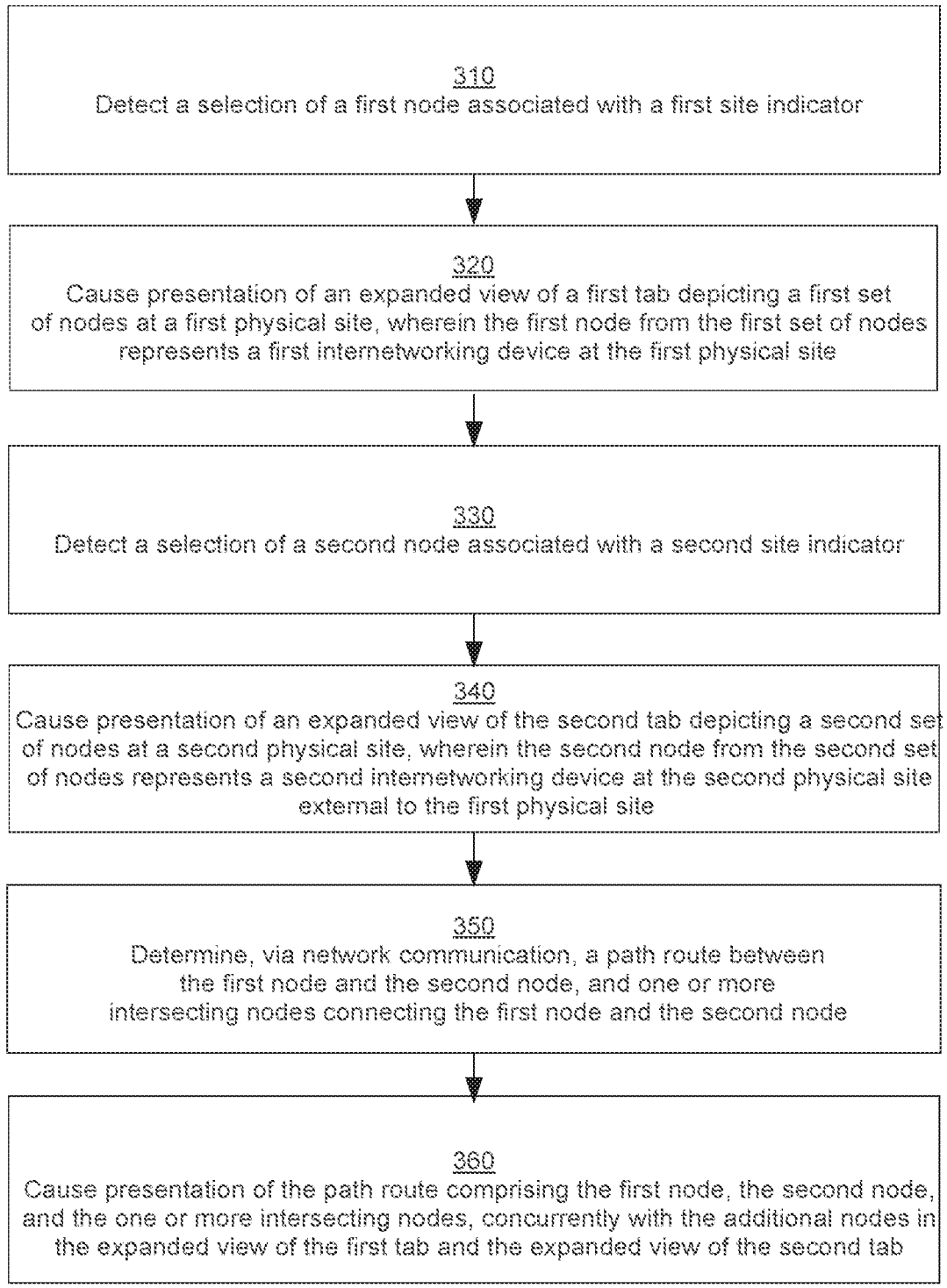
FIG. 3 illustrates an example process for displaying the network topology map.

FIG. 3 illustrates an example process for displaying the network topology map. FIG. 3 is intended to disclose an algorithm or functional description that may be used as a basis of writing computer programs to implement the functions that are described herein, and which cause a computer to operate in the new manner that is disclosed herein. The steps of the process may be performed in any order and are not limited to the order shown in FIG. 3.

At step 310, a selection of a first node associated with a first site indicator that is associated with a first tab is detected in a computer-generated graphical user interface. The first tab is from a plurality of tabs that are associated with a corresponding network topology map. Each of the plurality of tabs corresponds to a physical site that has one or more building units and one or more internetworking devices. In some embodiments, the tabs may represent building units. The network topology map includes a location panel that displays site indicators representing various physical sites or building units and a map panel that displays one or more nodes representing various internetworking infrastructure elements.

At step 320, in response to detecting the selection of the first node, presentation of an expanded view of the first tab depicting a first set of nodes at a first physical site is configured to be caused. The selection of the first node can cause the map panel with the selected physical site network topology map to be displayed in the computer-generated graphical user interface. The expanded view of the first tab is displayed in a graphical boundary that represents a geographic boundary of the first physical site. The first node of the first set of nodes may be depicted in the expanded view of the first tab as internal to the graphical boundary and the first site indicator is depicted as external to the graphical boundary. The first node represents a first internetworking device at the first physical site. In some embodiments, the first node can be selected as a source node to initiate the data transmission. The selection can be made by the computing device or by the end user in the computer-generated graphical user interface.

At step 330, a selection of a second node associated with a second site indicator that is associated with a second tab is detected in the computer-generated graphical user interface. The second tab is from the plurality of tabs that are associated with a corresponding network topology map. The second tab is associated with the second physical site that is different from the first physical site.

At step 340, in response to detecting the selection of the second node, presentation of an expanded view of the second tab depicting a second set of nodes at a second physical site is configured to be caused. The selection of the second node can cause the map panel with the selected physical site network topology map to be displayed in the computer-generated graphical user interface. The expanded view of the second tab is displayed in a graphical boundary that represents a geographic boundary of the second physical site. The second node of the second set of nodes may be depicted in the expanded view of the second tab as internal to the graphical boundary and the second site indicator is depicted as external to the graphical boundary. In some embodiments, the second node can be selected as a destination node to receive the data packet. The selection can be made by the computing device or by the end user in the computer-generated graphical user interface.

At step 350, the path route between the first node the second node is determined. The path route facilitates a data packet to travel through the link within the network. The path route may represent an optimal traffic route from the first node to the second node. In addition to the path route, one or more intersecting nodes connecting the first node and the second node are determined. The one or more intersecting nodes are part of the path route with the first node and the second node.

In some embodiments, additional nodes that are immediately adjacent to the intersecting nodes are determined. The additional nodes are immediately connected to the intersecting nodes (e.g., first-degree connection) that are displayed along with the path route in the network topology map in the graphical user interface.

At step 360, in response to determining that the first node is linked to the second node via the path route, presentation of the path route comprising the first node, the second node, and the intersecting nodes, concurrently with the additional nodes is caused in the expanded view of the first tab and the expanded view of the second tab. The path route may be overlaid partially over the graphical boundary of the first tab and partially over the second tab. The path route may be highlighted concurrently with the first node, the intersecting nodes, and the second node to indicate an available communication path between the first node and the second node. In some embodiments, the additional nodes may be displayed using visually different attributes compared to the path route. The network topology map may be displayed in a single-site view to clearly display all the hierarchical network topology structure.

In some embodiments, an expanded view of a third tab may be displayed in the graphical user interface connecting the first node and the second node. The third tab is associated with a third physical site that may connect both the first node and the second node via the path route. The path route may pass through the expanded view of the third tab to indicate that the connection between the first node and the second node. The expanded view of the third tab may be displayed adjacent to the first tab and the second tab.

In some embodiments, the user may select or hover over the first node in the expanded view of the first tab. Upon detecting the selection of the first node, transmission information or routing information can be received from the first node. The transmission information may include an IP address, physical location, network role identifier, metrics information, and networking issue description. Other transmission information of the node may be available based on the node or the interface setting.

Using these approaches, hierarchical networking elements and data path connecting the networking elements can be displayed in a digestible way in a single-view display. These approaches have the benefit of allowing users to easily understand the connection and the traffic route of the networking elements in details despite the diversified association between nodes located in different sites. Using the single-view graphical interface with selectable expanded and collapsed tabs prevents loss of connection information when data route links one or more nodes that are connected to buildings or physical sites outside of the associated building or physical site. The approach disclosed herein can simplify the information for monitoring the networking equipment and diagnosing and troubleshooting the network issues. These approaches can permit the network administrators to view the association of the nodes and identify the optimal communication path for data transmission.

4. Implementation Mechanisms-Hardware Overview

Figure 4:
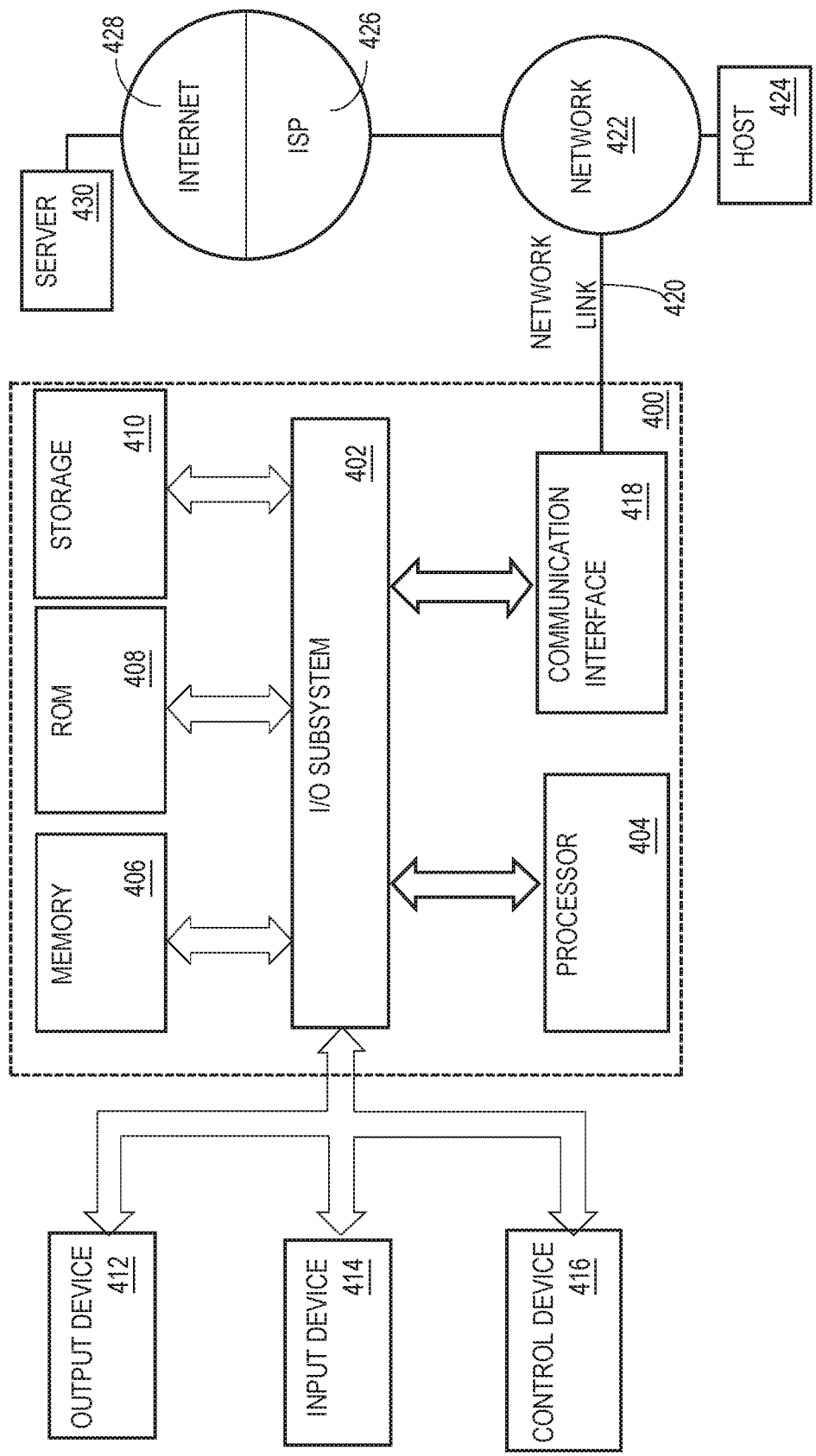
FIG. 4 illustrates an example computer system with which an embodiment may be implemented.

FIG. 4 is a block diagram that illustrates an example computer system with which an embodiment may be implemented. In the example of FIG. 4, a computer system 400 and instructions for implementing the disclosed technologies in hardware, software, or a combination of hardware and software, are represented schematically, for example as boxes and circles, at the same level of detail that is commonly used by persons of ordinary skill in the art to which this disclosure pertains for communicating about computer architecture and computer systems implementations.

Computer system 400 includes an input/output (I/O) subsystem 402 which may include a bus and/or other communication mechanism(s) for communicating information and/or instructions between the components of the computer system 400 over electronic signal paths. The I/O subsystem 402 may include an I/O controller, a memory controller and at least one I/O port. The electronic signal paths are represented schematically in the drawings, for example as lines, unidirectional arrows, or bidirectional arrows.

At least one hardware processor 404 is coupled to I/O subsystem 402 for processing information and instructions. Hardware processor 404 may include, for example, a general-purpose microprocessor or microcontroller and/or a special-purpose microprocessor such as an embedded system or a graphics processing unit (GPU) or a digital signal processor or ARM processor. Processor 404 may comprise an integrated arithmetic logic unit (ALU) or may be coupled to a separate ALU.

Computer system 400 includes one or more units of memory 406, such as a main memory, which is coupled to I/O subsystem 402 for electronically digitally storing data and instructions to be executed by processor 404. Memory 406 may include volatile memory such as various forms of random-access memory (RAM) or other dynamic storage device. Memory 406 also may be used for storing temporary variables or other intermediate information during execution of instructions to be executed by processor 404. Such instructions, when stored in non-transitory computer-readable storage media accessible to processor 404, can render computer system 400 into a special-purpose machine that is customized to perform the operations specified in the instructions.

Computer system 400 further includes non-volatile memory such as read only memory (ROM) 408 or other static storage device coupled to I/O subsystem 402 for storing information and instructions for processor 404. The ROM 408 may include various forms of programmable ROM (PROM) such as erasable PROM (EPROM) or electrically erasable PROM (EEPROM). A unit of persistent storage 410 may include various forms of non-volatile RAM (NVRAM), such as FLASH memory, or solid-state storage, magnetic disk or optical disk such as CD-ROM or DVD-ROM and may be coupled to I/O subsystem 402 for storing information and instructions. Storage 410 is an example of a non-transitory computer-readable medium that may be used to store instructions and data which when executed by the processor 404 cause performing computer-implemented methods to execute the techniques herein.

The instructions in memory 406, ROM 408 or storage 410 may comprise one or more sets of instructions that are organized as modules, methods, objects, functions, routines, or calls. The instructions may be organized as one or more computer programs, operating system services, or application programs including mobile apps. The instructions may comprise an operating system and/or system software; one or more libraries to support multimedia, programming or other functions; data protocol instructions or stacks to implement TCP/IP, HTTP or other communication protocols; file format processing instructions to parse or render files coded using HTML, XML, JPEG, MPEG or PNG; user interface instructions to render or interpret commands for a graphical user interface (GUI), command-line interface or text user interface; application software such as an office suite, internet access applications, design and manufacturing applications, graphics applications, audio applications, software engineering applications, educational applications, games or miscellaneous applications. The instructions may implement a web server, web application server or web client. The instructions may be organized as a presentation layer, application layer and data storage layer such as a relational database system using structured query language (SQL) or no SQL, an object store, a graph database, a flat file system or other data storage.

Computer system 400 may be coupled via I/O subsystem 402 to at least one output device 412. In one embodiment, output device 412 is a digital computer display. Examples of a display that may be used in various embodiments include a touch screen display or a light-emitting diode (LED) display or a liquid crystal display (LCD) or an e-paper display. Computer system 400 may include other type(s) of output devices 412, alternatively or in addition to a display device. Examples of other output devices 412 include printers, ticket printers, plotters, projectors, sound cards or video cards, speakers, buzzers or piezoelectric devices or other audible devices, lamps or LED or LCD indicators, haptic devices, actuators or servos.

At least one input device 414 is coupled to I/O subsystem 402 for communicating signals, data, command selections or gestures to processor 404. Examples of input devices 414 include touch screens, microphones, still and video digital cameras, alphanumeric and other keys, keypads, keyboards, graphics tablets, image scanners, joysticks, clocks, switches, buttons, dials, slides, and/or various types of sensors such as force sensors, motion sensors, heat sensors, accelerometers, gyroscopes, and inertial measurement unit (IMU) sensors and/or various types of transceivers such as wireless, such as cellular or Wi-Fi, radio frequency (RF) or infrared (IR) transceivers and Global Positioning System (GPS) transceivers.

Another type of input device is a control device 416, which may perform cursor control or other automated control functions such as navigation in a graphical interface on a display screen, alternatively or in addition to input functions. Control device 416 may be a touchpad, a mouse, a trackball, or cursor direction keys for communicating direction information and command selections to processor 404 and for controlling cursor movement on output device (e.g., display) 412. The input device may have at least two degrees of freedom in two axes, a first axis (e.g., x) and a second axis (e.g., y), that allows the device to specify positions in a plane. Another type of input device is a wired, wireless, or optical control device such as a joystick, wand, console, steering wheel, pedal, gearshift mechanism or other type of control device. An input device 414 may include a combination of multiple different input devices, such as a video camera and a depth sensor.

In another embodiment, computer system 400 may comprise an internet of things (IoT) device in which one or more of the output device 412, input device 414, and control device 416 are omitted. Or, in such an embodiment, the input device 414 may comprise one or more cameras, motion detectors, thermometers, microphones, seismic detectors, other sensors or detectors, measurement devices or encoders and the output device 412 may comprise a special-purpose display such as a single-line LED or LCD display, one or more indicators, a display panel, a meter, a valve, a solenoid, an actuator or a servo.

When computer system 400 is a mobile computing device, input device 414 may comprise a global positioning system (GPS) receiver coupled to a GPS module that is capable of triangulating to a plurality of GPS satellites, determining and generating geo-location or position data such as latitude-longitude values for a geophysical location of the computer system 400. Output device 412 may include hardware, software, firmware and interfaces for generating position reporting packets, notifications, pulse or heartbeat signals, or other recurring data transmissions that specify a position of the computer system 400, alone or in combination with other application-specific data, directed toward host 424 or server 430.

Computer system 400 may implement the techniques described herein using customized hard-wired logic, at least one ASIC, GPU, or FPGA, firmware and/or program instructions or logic which when loaded and used or executed in combination with the computer system causes or programs the computer system to operate as a special-purpose machine. According to one embodiment, the techniques herein are performed by computer system 400 in response to processor 404 executing at least one sequence of at least one instruction contained in main memory 406. Such instructions may be read into main memory 406 from another storage medium, such as storage 410. Execution of the sequences of instructions contained in main memory 406 causes processor 404 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage 410. Volatile media includes dynamic memory, such as memory 406. Common forms of storage media include, for example, a hard disk, solid state drive, flash drive, magnetic data storage medium, any optical or physical data storage medium, memory chip, or the like.

Storage media is distinct from but may be used in conjunction with transmission media. Transmission media participates in transferring information between storage media. For example, transmission media includes coaxial cables, copper wire and fiber optics, including the wires that comprise a bus of I/O subsystem 402. Transmission media can also take the form of acoustic or light waves, such as those generated during radio-wave and infra-red data communications.

Various forms of media may be involved in carrying at least one sequence of at least one instruction to processor 404 for execution. For example, the instructions may initially be carried on a magnetic disk or solid-state drive of a remote computer. The remote computer can load the instructions into its dynamic memory and send the instructions over a data link such as a fiber optic or coaxial cable or telephone line using a modem. A modem or router local to computer system 400 can receive the data on the data link and convert the data to a format that can be read by computer system 400. For instance, a receiver such as a radio frequency antenna or an infrared detector can receive the data carried in a wireless or optical signal and appropriate circuitry can provide the data to I/O subsystem 402 such as place the data on a bus. I/O subsystem 402 carries the data to memory 406, from which processor 404 retrieves and executes the instructions. The instructions received by memory 406 may optionally be stored on storage 410 either before or after execution by processor 404.

Computer system 400 also includes a communication interface 418 coupled to bus 402. Communication interface 418 provides a two-way data communication coupling to network link(s) 420 that are directly or indirectly connected to at least one communication networks, such as a network 422 or a public or private cloud on the Internet. For example, communication interface 418 may be an Ethernet networking interface, integrated-services digital network (ISDN) card, cable modem, satellite modem, or a modem to provide a data communication connection to a corresponding type of communications line, for example an Ethernet cable or a metal cable of any kind or a fiber-optic line or a telephone line. Network 422 broadly represents a local area network (LAN), wide-area network (WAN), campus network, internetwork or any combination thereof. Communication interface 418 may comprise a LAN card to provide a data communication connection to a compatible LAN, or a cellular radiotelephone interface that is wired to send or receive cellular data according to cellular radiotelephone wireless networking standards, or a satellite radio interface that is wired to send or receive digital data according to satellite wireless networking standards. In any such implementation, communication interface 418 sends and receives electrical, electromagnetic or optical signals over signal paths that carry digital data streams representing various types of information.

Network link 420 typically provides electrical, electromagnetic, or optical data communication directly or through at least one network to other data devices, using, for example, satellite, cellular, Wi-Fi, or BLUETOOTH technology. For example, network link 420 may provide a connection through a network 422 to a host computer 424.

Furthermore, network link 420 may provide a connection through network 422 or to other computing devices via internetworking devices and/or computers that are operated by an Internet Service Provider (ISP) 426. ISP 426 provides data communication services through a world-wide packet data communication network represented as internet 428. A server computer 430 may be coupled to internet 428. Server 430 broadly represents any computer, data center, virtual machine or virtual computing instance with or without a hypervisor, or computer executing a containerized program system such as DOCKER or KUBERNETES. Server 430 may represent an electronic digital service that is implemented using more than one computer or instance and that is accessed and used by transmitting web services requests, uniform resource locator (URL) strings with parameters in HTTP payloads, API calls, app services calls, or other service calls. Computer system 400 and server 430 may form elements of a distributed computing system that includes other computers, a processing cluster, server farm or other organization of computers that cooperate to perform tasks or execute applications or services. Server 430 may comprise one or more sets of instructions that are organized as modules, methods, objects, functions, routines, or calls. The instructions may be organized as one or more computer programs, operating system services, or application programs including mobile apps. The instructions may comprise an operating system and/or system software; one or more libraries to support multimedia, programming or other functions; data protocol instructions or stacks to implement TCP/IP, HTTP or other communication protocols; file format processing instructions to parse or render files coded using HTML, XML, JPEG, MPEG or PNG; user interface instructions to render or interpret commands for a graphical user interface (GUI), command-line interface or text user interface; application software such as an office suite, internet access applications, design and manufacturing applications, graphics applications, audio applications, software engineering applications, educational applications, games or miscellaneous applications. Server 430 may comprise a web application server that hosts a presentation layer, application layer and data storage layer such as a relational database system using structured query language (SQL) or no SQL, an object store, a graph database, a flat file system or other data storage.

Computer system 400 can send messages and receive data and instructions, including program code, through the network(s), network link 420 and communication interface 418. In the Internet example, a server 430 might transmit a requested code for an application program through Internet 428, ISP 426, local network 422 and communication interface 418. The received code may be executed by processor 404 as it is received, and/or stored in storage 410, or other non-volatile storage for later execution.

The execution of instructions as described in this section may implement a process in the form of an instance of a computer program that is being executed and consisting of program code and its current activity. Depending on the operating system (OS), a process may be made up of multiple threads of execution that execute instructions concurrently. In this context, a computer program is a passive collection of instructions, while a process may be the actual execution of those instructions. Several processes may be associated with the same program; for example, opening several instances of the same program often means more than one process is being executed. Multitasking may be implemented to allow multiple processes to share processor 404. While each processor 404 or core of the processor executes a single task at a time, computer system 400 may be programmed to implement multitasking to allow each processor to switch between tasks that are being executed without having to wait for each task to finish. In an embodiment, switches may be performed when tasks perform input/output operations, when a task indicates that it can be switched, or on hardware interrupts. Time-sharing may be implemented to allow fast response for interactive user applications by rapidly performing context switches to provide the appearance of concurrent execution of multiple processes simultaneously. In an embodiment, for security and reliability, an operating system may prevent direct communication between independent processes, providing strictly mediated and controlled inter-process communication functionality.

Although some of the figures described in the foregoing specification include flow diagrams with steps that are shown in an order, the steps may be performed in any order, and are not limited to the order shown in those flowcharts. Additionally, some steps may be optional, may be performed multiple times, and/or may be performed by different components. All steps, operations and functions of a flow diagram that are described herein are intended to indicate operations that are performed using programming in a special-purpose computer or general-purpose computer, in various embodiments. In other words, each flow diagram in this disclosure, in combination with the related text herein, is a guide, plan or specification of all or part of an algorithm for programming a computer to execute the functions that are described. The level of skill in the field associated with this disclosure is known to be high, and therefore the flow diagrams and related text in this disclosure have been prepared to convey information at a level of sufficiency and detail that is normally expected in the field when skilled persons communicate among themselves with respect to programs, algorithms and their implementation.

In the foregoing specification, the example embodiment(s) of the present invention have been described with reference to numerous specific details. However, the details may vary from implementation to implementation according to the requirements of the particular implement at hand. The example embodiment(s) are, accordingly, to be regarded in an illustrative rather than a restrictive sense.

What is claimed is:

1. A computer-implemented method comprising:
    detecting a selection of a first node associated with a first site indicator, the first site indicator being associated with a first tab from a plurality of tabs associated with a network topology map in a computer-generated graphical user interface;
    in response to detecting the selection of the first node, causing presentation of an expanded view of the first tab depicting a first set of nodes at a first physical site, wherein the first node from the first set of nodes represents a first internetworking device at the first physical site;
    detecting a selection of a second node associated with a second site indicator, the second site indicator being associated with a second tab from the plurality of tabs associated with the network topology map;
    in response to detecting the selection of the second node, causing presentation of an expanded view of the second tab depicting a second set of nodes at a second physical site, wherein the second node from the second set of nodes represents a second internetworking device at the second physical site external to the first physical site;
    determining, via a network communication, a path route between the first node to the second node, and one or more intersecting nodes connecting the first node and the second node;
    determining, via the network communication, additional nodes that are immediately adjacent to the one or more intersecting nodes; and
    causing presentation of the path route comprising the first node, the second node, and the one or more intersecting nodes, concurrently with the additional nodes in the expanded view of the first tab and the expanded view of the second tab, wherein the path route is partially displayed over the expanded view of the first tab and partially over the expanded view of the second tab, wherein the path route is highlighted concurrently with the first node, the intersecting nodes, and the second node to indicate an available communication path between the first node and the second node, and wherein the additional nodes are displayed using visually different attributes compared to the path route.

2. The computer-implemented method of claim 1, further comprising:
    receiving, from the first node, transmission information of the first node; and
    causing presentation of transmission information in the expanded view of the first tab, the transmission information comprising at least one of the following: an IP address, a physical site location, a role identifier, and a plurality of metrics associated with the first node.

3. The computer-implemented method of claim 1, further comprising:
receiving a request to display the path route starting from the first node to the second node, wherein the path route represents an optimal traffic route from the first node to the second node.

4. The computer-implemented method of claim 1, further comprising:
determining one or more nodes connected to the additional nodes, the one or more nodes are non-immediately adjacent nodes to the intersecting nodes;
displaying a first additional node and a corresponding selection widget in the first tab;
receiving an input on the corresponding selection widget; and
in response to receiving the input on the corresponding selection widget, causing presentation of the one or more nodes connected to the first additional node in the expanded view of the first tab.

5. The computer-implemented method of claim 1, wherein each of the plurality of tabs corresponds to a physical site that has one or more internetworking devices.

6. The computer-implemented method of claim 1, further comprising:
determining that a third tab is connected between the first tab and the second tab, the third tab depicting a third set of nodes at a third physical site external to the first physical site and the second physical site;
determining that the third tab comprises the third set of nodes different than the first node and the second node; and
upon determining that the third tab comprises the third set of nodes different than the first node and the second node, causing presentation of an expanded view of the third tab concurrently with the expanded view of the first tab and the expanded view of the second tab in the network topology map.

7. The computer-implemented method of claim 6, wherein the expanded view of the first tab comprises a graphical boundary that represents a geographic boundary of the first physical site, wherein the first node is depicted in the expanded view as internal to the graphical boundary, wherein the first site indicator is depicted as external to the graphical boundary, wherein the first site indicator and the second site indicator are depicted in a panel external to the geographic boundary of the first tab, and wherein presenting the path route comprises causing the path route to overlay the graphical boundary of the first physical site.

8. The computer-implemented method of claim 1, wherein the first internetworking device represents any of a router, a switch or a gateway for a first local network associated with the first physical site.

9. A non-transitory computer-readable storage media storing instructions that, when executed by one or more processors, perform a method comprising:
detecting a selection of a first node associated with a first site indicator, the first site indicator being associated with a first tab from a plurality of tabs associated with a network topology map in a computer-generated graphical user interface;
in response to detecting the selection of the first node, causing presentation of are expanded view of the first tab depicting a first set of nodes at a first physical site, wherein the first node from the first set of nodes represents a first internetworking device at the first physical site;
detecting a selection of a second node associated with a second site indicator, the second site indicator being associated with a second tab from the plurality of tabs associated with the network topology map;
in response to detecting the selection of the second node, causing presentation of an expanded view of the second tab depicting a second set of nodes at a second physical site, wherein the second node from the second set of nodes represents a second internetworking device at the second physical site external to the first physical site;
determining, via a network communication, a path route between the first node to the second node, and one or more intersecting nodes connecting the first node and the second node;
determining, via the network communication, additional nodes that are immediately adjacent to the one or more intersecting nodes; and
causing presentation of the path route comprising the first node, the second node, and the one or more intersecting nodes, concurrently with the additional nodes in the expanded view of the first tab and the expanded view of the second tab, wherein the path route is partially displayed over the expanded view of the first tab and partially over the expanded view of the second tab, wherein the path route is highlighted concurrently with the first node, the intersecting nodes, and the second node to indicate an available communication path between the first node and the second node, and wherein the additional nodes are displayed using visually different attributes compared to the path route.

10. The non-transitory computer-readable storage media of claim 9, when executed, the method further comprising:
receiving, from the first node, transmission information of the first node; and
causing presentation of transmission information in the expanded view of the first tab, the transmission information comprising an IP address, a physical site location, a role identifier, or a plurality of metrics associated with the first node.

11. The non-transitory computer-readable storage media of claim 9, when executed, the method further comprising:
receiving a request to display the path route starting from the first node to the second node, wherein the path route represents an optimal traffic route from the first node to the second node.

12. The non-transitory computer-readable storage media of claim 9, when executed, the method further comprising:
determining one or more nodes connected to the additional nodes, the one or more nodes are non-immediately adjacent nodes to the intersecting nodes;
displaying a first additional node and a selection widget corresponding to the first additional node in the first tab;
receiving an input on the selection widget; and
in response to receiving the input on the selection widget, causing presentation of the one or more nodes connected to the first additional node in the expanded view of the first tab.

13. The non-transitory computer-readable storage media of claim 9, wherein each of the plurality of tabs corresponds to a physical site that has one or more internetworking devices.

14. The non-transitory computer-readable storage media of claim 9, when executed, the method further comprising:

determining that a third tab is connected between the first tab and the second tab, the third tab depicting a third set of nodes at a third physical site external to the first physical site and the second physical site; and determining that the third tab comprises the third set of nodes different than the first node and the second node; and upon determining that the third tab comprises the third set of nodes different than the first node and the second node, causing presentation of an expanded view of the third tab concurrently with the expanded view of the first tab and the expanded view of the second tab in the network topology map.

15. The non-transitory computer-readable storage media of claim 14, wherein the expanded view of the first tab comprises a graphical boundary that represents a geographic boundary of the first physical site, wherein the first node is depicted in the expanded view as internal to the graphical boundary, wherein the first site indicator is depicted as external to the graphical boundary, and wherein presenting the path route comprises causing the path route to overlay the graphical boundary of the first physical site.

16. The non-transitory computer-readable storage media of claim 9, wherein the first internetworking device represents any of a router, a switch or a gateway for a first local network associated with the first physical site.

17. A system comprising:
a memory device;
a processor communicatively coupled to the memory device, wherein the processor is configured to:
detect a selection of a first node associated with a first site indicator, the first site indicator being associated with a first tab from a plurality of tabs associated with a network topology map in a computer-generated graphical user interface;
in response to detecting the selection of the first node, cause presentation of an expanded view of the first tab depicting a first set of nodes at a first physical site, wherein the first node from the first set of nodes represents a first internetworking device at the first physical site;
detect a selection of a second node associated with a second site indicator, the second site indicator being associated with a second tab from the plurality of tabs associated with the network topology map;
in response to detecting the selection of the second node, cause presentation of an expanded view of the second tab depicting a second set of nodes at a second physical site, wherein the second node from the second set of nodes represents a second internetworking device at the second physical site external to the first physical site;
determine, via a network communication, a path route between the first node to the second node, and one or more intersecting nodes connecting the first node and the second node;
determine, via the network communication, additional nodes that are immediately adjacent to the one or more intersecting nodes; and
cause presentation of the path route comprising the first node, the second node, and the one or more intersecting nodes, concurrently with the additional nodes in the expanded view of the first tab and the expanded view of the second tab, wherein the path route is partially displayed over the expanded view of the first tab and partially over the expanded view of the second tab, wherein the path route is highlighted concurrently with the first node, the intersecting nodes, and the second node to indicate an available communication path between the first node and the second node, and wherein the additional nodes are displayed using visually different attributes compared to the path route.

18. The system of claim 17, wherein the processor is further configured to:
receive from the first node, transmission information of the first node; and
cause presentation of transmission information in the expanded view of the first tab, the transmission information comprising an IP address, a physical site location, a role identifier, or a plurality of metrics associated with the first node.

19. The system of claim 17, wherein the path route represents an optimal traffic route from the first node to the second node.

20. The system of claim 19, wherein the first physical site comprises a first building unit.

* * * * *